United States Patent
Huthwohl et al.

(10) Patent No.: US 6,739,124 B2
(45) Date of Patent: May 25, 2004

(54) EXHAUST GAS PURIFICATION SYSTEM (75) Inventors: Georg Huthwohl, Soest (DE); Bernd Maurer, Balve (DE); Alexander Funk, Iserlohn (DE)

(73) Assignee: PUReM Abgassystem GmbH & Co. KG, Unna (DE)

( * ) Notice: Subject to any disclaimer, the term of this patent is extended or adjusted under 35 U.S.C. 154(b) by 0 days.

(21) Appl. No.: 10/025,356

(22) Filed: Dec. 18, 2001

(65) Prior Publication Data

US 2002/0134074 A1 Sep. 26, 2002

(30) Foreign Application Priority Data

Dec. 18, 2001 (DE) .................................. 200 21 398 U (51) Int. Cl.[7] ............................................. F01N 3/00
(52) U.S. Cl. ..................... 60/286; 60/295; 222/399; 222/400.7; 285/31; 285/361; 285/402
(58) Field of Search ................ 60/274, 285, 286, 60/295, 303; 220/721; 222/399, 400.7; 439/314; 285/24, 27, 31, 361, 398, 402

(56) References Cited

U.S. PATENT DOCUMENTS

| 3,561,649 | A | * | 2/1971 | Wilson | ....................... 222/399 |
| 3,653,557 | A | * | 4/1972 | Lamb | ..................... 222/400.7 |
| 4,332,273 | A | | 6/1982 | Boyce | |
| 5,884,475 | A | * | 3/1999 | Hofmann et al. | .............. 60/286 |
| 5,992,141 | A | * | 11/1999 | Berriman et al. | ............. 60/286 |
| 6,226,068 | B1 | * | 5/2001 | Arcykiewicz et al. | ....... 439/314 |
| 6,298,961 | B1 | * | 10/2001 | Hageman et al. | ........... 220/721 |

FOREIGN PATENT DOCUMENTS

| DE | 297 08 591 U1 | 5/1997 |
| DE | 197 38 859 A 1 | 3/1999 |
| EP | 1 199 499 A2 | 4/2002 |
| GB | 2 249 610 A | 10/1990 |
| JP | 3-229911 | * 10/1991 |

* cited by examiner

*Primary Examiner*—Thomas Denion
*Assistant Examiner*—Tu M. Nguyen
(74) *Attorney, Agent, or Firm*—Rick Martin; Patent Law Offices of Rick Martin, P.C.

(57) ABSTRACT

An exhaust gas purification system for denoxing exhaust gases of a combustion unit on an SCR catalyst 2 utilizing ammonia ($NH_3$) additionally introduced into the exhaust gas flow before the SCR catalyst 2, which has at least one reducing agent container 4, in which the $NH_3$ (5) to be supplied to the exhaust gas flow is stored, which container 4 is connected via a supply line 7 with the exhaust gas line 1, and is adapted so that at least one reducing agent container 4 is held in a docking device 15 as a portion of the exhaust gas purification system 3 and, via a coupling 20, 21, is connected with the supply line 7. Of coupling 20, 22 one coupling part 22 is associated with the docking device 15 and the other coupling part 20 with the container 4, so that both coupling parts 20, 22 can be engaged with one another via an axial movement directed toward one another. The docking device 15 and the at least one container 4 have cooperating guide 21, 26, 27, 28 through which the container 4 under guidance can be brought into its specified position for joining the two coupling parts 20, 22.

24 Claims, 4 Drawing Sheets

EXHAUST GAS PURIFICATION SYSTEM

CROSS REFERENCE APPLICATIONS

This application claims priority from German application no. 200 21 398.9 filed Dec. 18, 2000.

FIELD OF INVENTION

The present invention relates to an exhaust gas purification system for denoxing exhaust gases (i.e. removing oxides of nitrogen) of a combustion unit on an SCR catalyst utilizing ammonia ($NH_3$), additionally introduced into the exhaust gas flow before the SCR catalyst.

BACKGROUND OF THE INVENTION

Apart from carbon monoxide (CO) and hydrocarbons (HC), in particular nitrogen oxides ($NO_x$) are among the environmentally harmful, directly emitted primary injurious substances which are generated during operation of internal combustion engines, in particular Diesel engines. Such nitrogen oxides include such compounds as nitric oxide, nitrogen trioxide ($N_2O_3$), dinitrogen tetroxide ($N_2O_4$), nitrogen dioxide (NO2) and trinitrogen tetroxide ($N_3O_4$). The use of three-way catalysts, such as are used in Otto engines and gas engines, cannot be used in the exhaust of Diesel engines due to an excess of oxygen. For this reason, for the reduction of the nitrogen oxides emission in Diesel engines a selectively working SCR catalyst (Selective Catalytic Reduction catalyst) was developed, in which the expelled nitrogen oxides are reduced to $N_2$ and $H_2O$ in the presence of a supplied reducing agent, namely ammonia ($NH_3$).

Such exhaust gas purification systems are known, for example, from EP 0 277 765 A1 or EP 0 381 276 A1. The $NH_3$ is stored as a fluid in a pressure-tight container and connected with the exhaust gas line via a supply line. From the reducing agent container the gaseous $NH_3$ is tapped, then injected in the required quantity into the exhaust gas flow via a metering valve driven by a control unit. Metering of the $NH_3$ quantity takes place as a function of the instantaneous operating states of the combustion unit. These patents are incorporated herein by reference.

In these prior known commercially available systems, pressure-tight gas cylinders are employed as reducing agent containers. The containers are connected in conventional manner to the supply line by means of a screw connection. When using such a prior known exhaust gas purification system in a motor vehicle, for example in a commercial motor vehicle, the intent is to provide the employed reducing agent container for reasons of safety, but in particular also for reasons of handling techniques, such that it is not too large. Therefore the reducing agent containers in such exhaust gas purification systems applied in a motor vehicle must be replaced frequently. For reasons of handling techniques, however, for replacing such a container it is not appropriate, and correspondingly time-consuming, if with one or several $NH_3$ gas cylinders carried on board, first, all connections must be unscrewed and subsequently newly emplaced filled reduction containers must be screwed on. Moreover, in the case of such a conventional connection of prior known containers, it is a disadvantage that the person replacing the reducing agent container by necessity is in the direct proximity of the free end of the supply line so that it is possible that he is in contact with the gaseous $NH_3$ flowing out of the supply line.

Building on this discussed prior art, the present invention is therefore based on the task of developing further an exhaust gas purification system according to the species described in the introduction, such that the disadvantages demonstrated regarding prior art are minimized if not even avoided.

SUMMARY OF THE INVENTION

This task is solved according to the invention, for one, wherein that at least one reducing agent container is held in a docking device as part of the exhaust gas purification system and, via a coupling device, is connected with the supply line, of which coupling device one coupling part is associated with the docking device and the other coupling part with the container, wherein both coupling parts can be engaged with an axial movement directed toward one another, and the docking device and the container comprise cooperating guide means through which a container under guidance can be brought into its specified position for joining the two coupling parts.

The task is further solved through a system or configuration for holding the reducing agent container(s) in the frame of a replacement container system and connecting it to an exhaust gas purification system such as cited in the introduction, which comprises a container changing system comprising a docking device and a two-part coupling device, the coupling device comprising one coupling part associated with the docking device and the other coupling part associated with at least one reducing agent container which is held in the docking device, wherein the two coupling parts can be engaged with one another. The docking device and the reducing agent container further comprise cooperating guide means, through which the reduction container(s) can be brought into the specified position (under guidance) for engaging the two coupling parts. Furthermore, this task is solved with a reducing agent container for application in an exhaust gas purification system such as cited in the introduction, comprising a cylindrical shell with one coupling part disposed on the head end of the container, while at the foot end handle means are disposed for handling the container for insertion into a docking device and during engagement of the two coupling parts.

The exhaust gas purification system according to the invention comprises a docking device for receiving at least one reducing container. This docking device includes a coupling part, which can be engaged with a second coupling part, associated with the reducing agent container, for the purpose of establishing a fluid connection between the container and the supply line. The two coupling parts are laid out or arranged in the manner of a quick connect coupling and can be engaged with one another via an axial movement, at least as a component, directed toward one another. To connect the two coupling parts, it can therefore be sufficient to simply move the two coupling parts axially toward one another until the specified connection is established. It can also be provided that the axial movement represents only a vectorial component of a movement toward one another of the two coupling parts, in which also a rotational component is included. In such a case the two coupling parts can be engaged for example by a bayonet coupling. The docking device further comprises guide means through which a container can be brought into its specified position for joining the two coupling parts. The guide means can comprise such means which serve for guiding and supporting the container as such and can comprise further guide means which are provided to place the two coupling parts for engagement with one another as specified.

In the case of an exhaust gas purification system equipped with such a docking device, not only can a quick change of the applied reduction container take place, but it is in particular possible to connect through the applied guide means the container(s) to the supply line without anyone needing to directly guide the coupling parts themselves for joining the coupling parts. Consequently, such containers can be connected to the exhaust gas purification system via the docking device whereby the reduction container is handled at its end opposing the coupling part and the person carrying out the container replacement thus is located at a relatively great distance from the two coupling parts which have to be placed for engagement with one another. For this purpose a reducing agent container for such an exhaust gas purification system comprises at its foot end, opposing the coupling part, handle means for handling the reduction container. As a handle can be provided, for example, a ring with grip openings included therein and encircling the base of the container. For this purpose the containers are conveniently held in the horizontal position in the docking device.

To absorb the vibrations of the reduction container during the operation of a motor vehicle, with respect to the supply line and the units connected into the supply line, the coupling part associated with the docking device is usefully fastened on the docking device so as to be decoupled with respect to stresses. This can, for example, be realized through a floating bearing of the coupling part and through a tube connection between the coupling part and the supply line.

If the exhaust gas purification system comprises guide means for placing the two coupling parts into engagement with one another, which are developed in the manner of a bayonet coupling or lock, it is useful to provide these in annular bodies disposed concentrically with one another, wherein, associated with the container, is one such annular body encircling concentrically the coupling part associated with it with one or more top-side open bayonet grooves introduced therein and a further annular body disposed concentrically with the coupling part associated with the docking device with a number of guide pins corresponding to the number of bayonet grooves. Utilization of such a bayonet lock between the reduction container and the docking device enables a guided movement with which an axial displacement as well as also a rotational movement of the two coupling parts with respect to one another can be carried out. It can therein be provided that the applied guide grooves in a terminal section do not have a slope which is useful when, as the coupling is applied, and after the specified connection is established through a final rotational movement of the two coupling parts relative to one another, an actual opening takes place to establish the desired fluid connection.

A further embodiment of such exhaust gas purification system provides that the reducing agent container(s) set into the docking device additionally are locked through a locking device to secure the containers placed in the docking device. When using such a locking device, it is useful to provide means which permit closing the locking device only if the container(s) set into the docking device is(are) disposed therein as specified. Such additional securing means can be realized, for example, when the locking device comprises a locking arm pivotably articulated on the docking device, wherein such a locking arm is assigned to each reducing agent container set into the docking device. Further disposed on the locking arm are extensions which, at a specified positioning of the container assigned to the locking arm, extend into corresponding openings or recesses of the container. When using a reducing agent container as described above with a handle disposed on the base, such openings can be included, for example, in the lower rim of the handle.

The exhaust gas purification system can be configured to remove $NH_3$ from a reducing agent container either in its gaseous or in its liquid phase. It can be provided that $NH_3$ is contained in the reducing agent container in its pure form, in a mixed form or also chemically bound, from which chemical compounds it can be split off thermolytically. If the exhaust gas purification system is laid out or adapted for removing $NH_3$ gas from the reduction container, it is useful to associate a heat source with the docking device, which is implemented and arranged such that only a subregion of each reducing agent container or its contents will be heated by the heat source.

By heating the liquid $NH_3$ contained in the container, the vapor pressure in the reduction container increases correspondingly so that even at low ambient temperatures a satisfactory gas pressure is provided in order to provide a sufficient quantity of gaseous $NH_3$ for the exhaust gas purification. However, by heating the contents of the container it is also possible to empty the container completely. The same applies when a relatively large quantity of $NH_3$ is removed at one time from the container. In the claimed exhaust gas purification system the heat source is configured and disposed such that through the heat source only a subregion of the reduction container or its contents will be heated, and specifically such subregion of the reducing agent container in which the liquid $NH_3$ is contained, until it is emptied. As a rule, this is the furthest reaches of the container. Heating a subregion of the container is especially simple of realization since for this purpose only a low heat quantity is required and in an especially sophisticated manner the convection, occurring in the reduction container with local heating of the liquid $NH_3$, and with local boiling the turbulence induced through vapor bubble formation are utilized for heat distribution within the liquid contained in the container. Therefore in this exhaust gas purification system it is not necessary to heat the entire reduction container. Moreover, when applying a heat source causing only local heating, a control circuit responding significantly more rapidly can be developed, and employed.

The heat source employed can be, for example, a resistance heater or also as PTC element on the surface of the reducing agent container.

However, in a preferred embodiment of such an exhaust gas purification system the heat source is laid out or adapted for heating the contents of the reducing agent container from the outside, and free of contact. The advantage of such heating, which is contact-free with respect to the container, of its contents lies in that in this case the reduction container can be moved, in a simple manner after it has been emptied, from the frame of the described exchange system using the docking device. The empty container can then be replaced by a filled one without an additional subsequent mounting or setting up of the heat source having to be carried out. As a contact-free operating heat source can be provided, for example, one such which emits high-energy radiation wherein only a subregion of the reduction container—the local heating site—is located within the radiation of the heat source. The heat source can be configured out, for example, to emit IR (infrared) radiation, and with such an implementation it is useful to adapt the local heating site of the reduction container such that it is especially radiation absorptive, for example by being blackened. According to a further embodiment, the heat source for heating the liquid $NH_3$ can also be a transmitter for emitting microwave radiation as the high-energy radiation. It is understood that a subregion of the reduction container can also be irradiated or heat-activated by several other discrete heat sources. To facilitate the handling of the reducing agent container when it is heated, the handle is produced of a material with low thermal conductivity, for example of synthetic material.

When using such a heat source for heating the liquid $NH_3$ in the reducing agent container it is useful to equip the inner surface of the container in the region of the local heating site with means, for example roughening of the inner surface, which promote the formation of vapor bubbles, Formation of vapor bubbles can also be promoted with boiling chips in the case of such a surface such that an intensive heat distribution occurs through the turbulence generated with vapor bubble formation.

With such a configuration it is further useful if the output of the reducing agent container is succeeded by a liquid trap such that any liquid escaping during a change of a reducing agent container is collected in the liquid trap and does not penetrate into the further system. Such a liquid trap can also comprise a heating device to allow the $NH_3$ collected in the liquid trap to be vaporized and to supply the $NH_3$ in its gaseous phase to the provided exhaust gas purification system.

In case the exhaust gas purification system is laid out or adapted to remove $NH_3$ in its liquid phase from the reducing agent container, it is useful that a metering device is connected to the removal device in the direction of flow of $NH_3$ in the supply line and, succeeding the metering device, a vaporizer before the supply line ends in the exhaust gas line.

Due to this measure the removal of $NH_3$ is not dependent on a certain gas pressure in the reducing agent container such that $NH_3$ can be removed from the container at any time, and in particular under cold ambient conditions. When removing liquid $NH_3$, a nearly complete emptying of the reducing agent container is also possible. For this purpose the reducing agent container comprises a removal device for removing liquid $NH_3$, which can be developed, for example, in the manner of a nozzle tube. The entrance of liquid ammonia into such a removal nozzle tube can be realized through the vapor pressure in the container or also through a suction device.

The removal device for removing liquid $NH_3$ from the reducing agent container is succeeded in the direction of flow by a metering device, for example a metering valve, with which the particular required quantity of $NH_3$ is removed from the container. Succeeding the metering device is a vaporizer for vaporizing the $NH_3$ removed by the metering device from the reducing agent container. It can be provided that the meter device supplies $NH_3$ timed or continuously, in the particular required quantity, to the vaporizer. The vaporizer vaporizes the liquid $NH_3$ for injection into the exhaust gas line in the gaseous state.

In the case of an exhaust gas purification system operating according to the principle of the invention, vaporization of the liquid $NH_3$ takes place only in such a quantity as is in fact currently required in the exhaust gas line for carrying out the desired denoxing of the invention. It is therefore not necessary to configure the applied vaporizer such that it simultaneously serves as a storage container for a relatively large quantity of gaseous $NH_3$, from which the required quantity is subsequently removed for injection into the exhaust gas line. Consequently, the necessary safety requirements for the vaporizer are minimized.

To improve the safety of the exhaust gas purification system in the event of a failure of the vaporizer and in the event of a defective, open and no longer closable metering device, a further development provides a device for hindering or preventing the escape of liquid $NH_3$ disposed at the output of the vaporizer. Such a liquid barrier can be realized, for example, with a float valve which closes as soon as liquid is present at the output of the vaporizer. To hinder the escape of liquid from the vaporizer, however, a filter element can also be provided which allows gaseous $NH_3$ to penetrate but very little or no liquid $NH_3$. When using a float valve it is useful to provide it with appropriate sensors or switches such that the position of the float can be detected by a control device. If the system detects that the float valve is closed, which is equivalent to the presence of liquid $NH_3$ at the output of the vaporizer, for example, an emergency valve can be closed or the vaporizer can be started in order to convert the accumulated liquid $NH_3$ into its gaseous and thus less hazardous phase. Such a barrier device equipped with sensors can also switch the vaporizer directly on or off.

Succeeding the vaporizer in a preferred further embodiment is an air supply device through which additional air is supplied to the supply line connecting the reducing agent container with the exhaust gas line. This supplied air can serve in continuous operation of the exhaust gas purification system for increasing the transport rate of the gas generated in the vaporizer into the exhaust gas line and/or for flushing the supply line. Such flushing is useful in particular when a relatively long transport path to the exhaust gas line must be traversed between the vaporizer or, when using a liquid barrier device, between the liquid barrier device and the exhaust gas line.

It is useful to accommodate all of the units necessary for removing $NH_3$ in the docking device since, as a rule, it is protected against external influences. In this case only the terminal section of the supply line is between the docking device and the exhaust gas line. Such a configuration is useful in particular also for retrofitting present combustion units, since the critical components are all integrated in one module—the docking device—and lastly only one line must be carried to the exhaust gas line.

Other aspects of this invention will appear from the following description and appended claims, reference being made to the accompanying drawings forming a part of this specification wherein like reference characters designate corresponding parts in the several views.

In the following the invention is described in conjunction with an embodiment with reference to the enclosed figures, in which like components are labeled with like numerals. For clarity, certain components are not shown in all views and scales may vary within figures and/or between figures. Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
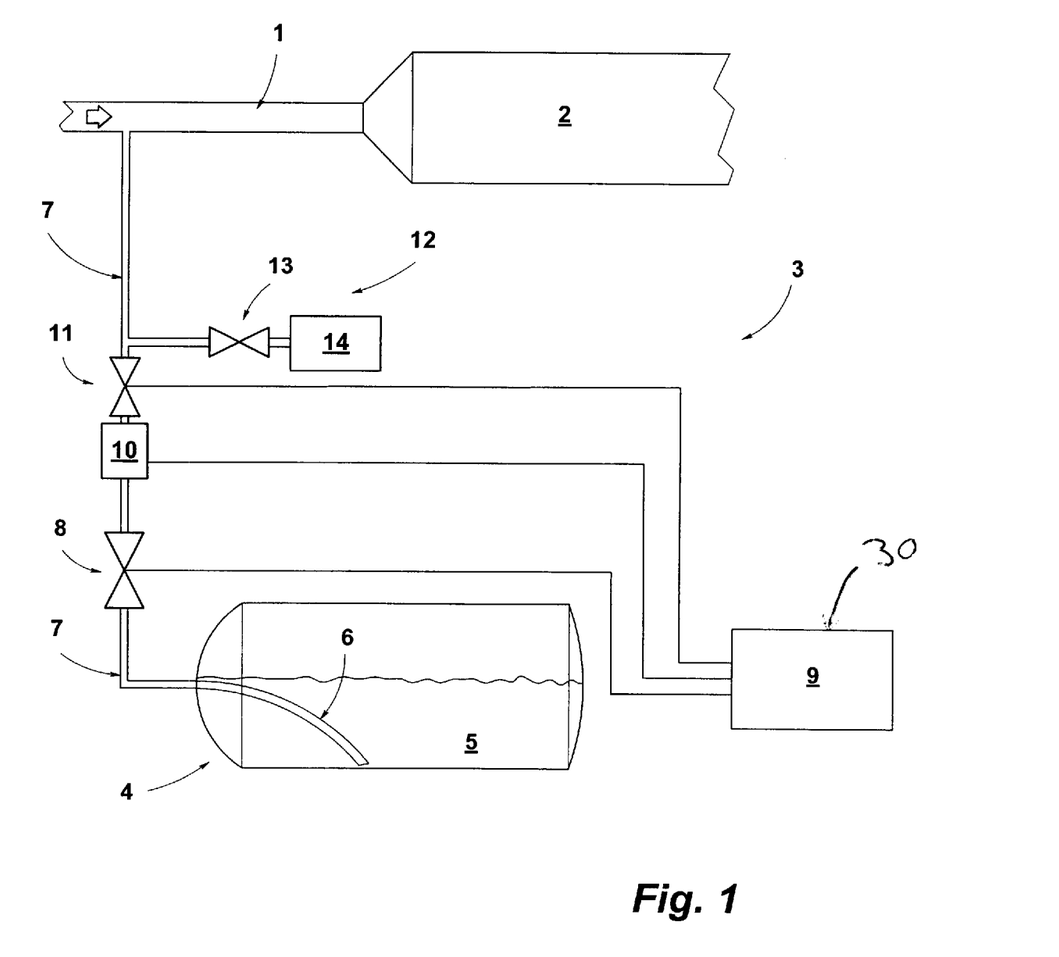
FIG. 1 a schematic block diagram of an exhaust gas purification system for supplying $NH_3$ into the exhaust gas line of an internal combustion engine, FIG. 2 a schematic three-dimensional representation of a docking device for receiving two reducing agent containers, FIG. 3 a three-dimensional representation of a reducing agent container, and FIG. 4 a section through the docking device of FIG. 2 with the two reducing agent containers inserted therein.

A motor vehicle, not further shown, with a Diesel engine shows an SCR catalyst 2 set into the exhaust gas line 1. With the exhaust gas line 1 is associated an exhaust gas purification system 3, via which, before the SCR catalyst 2, $NH_3$ is supplied as a reducing agent for denoxing the exhaust gases produced by an internal combustion engine, preceding the exhaust gas line 1 (not shown here). In the depicted embodiment, the exhaust gas purification system 3 comprises as essential components a reducing agent container 4 filled with liquid ammonia ($NH_3$) 5. The container 4 is therefore constructed such that it is pressure-tight, in order to be able to withstand the vapor pressure generated during the gasification of the $NH_3$. The exhaust gas purification system 3 is configured for removing liquid $NH_3$ from the container 4. For this purpose removal means such as a nozzle tube 6 is disposed in the container 4, which preferably extends into the furthest reaches of the container 4. In the depicted embodiment, the container 4 is placed in a horizontal position; in the event the container is disposed vertically in the motor vehicle, the removal nozzle tube extends into the region of its base. In a manner not further shown, the container 4 is connected via a coupling system to a supply line 7 for supplying the gaseous ammonia into the exhaust gas line 1. In the supply line 7 is interconnected a metering valve 8, before the supply line 7 opens into the exhaust gas line 1. The metering valve 8 is connected to a control system 9 which is acted upon by parameters representing the current engine operating state such that from these parameters the quantity of $NH_3$ to be supplied can be calculated.

Succeeding the metering valve 8 is a vaporizer 10 for vaporizing the quantity of $NH_3$ taken by the metering valve 8 from the container 4. Vaporizer 10 is also connected to the control system 9, for example an engine management system, which has the capability of switching the vaporizer to its different states and regulating it. At the output of the vaporizer 10 is connected into the supply line 7 a float valve 11, by which a liquid barrier is realized at the output of the vaporizer 10. In the presence of $NH_3$ in its liquid form at the output of the vaporizer 10, the float valve 11 closes so that liquid $NH_3$ is prevented from escaping with the metering valve 8 open and working vaporizer 10 inoperative. The float valve 11 is also connected to the control system 9, via which a detection of the position of the float takes place such that, when the control system 9 detects a closed float valve 11, appropriate actions can be triggered.

The float valve 11 is followed by the port of an air supply device 12, through which additional air is mixed into the remaining section of the supply line 7 between the air supply device 12 and the exhaust gas line 1. In the depicted embodiment, the air supply device 12 comprises a cycle valve 13 as well as an air source 14, which, when the exhaust gas purification system 3 is applied in a motor vehicle with compressed air brakes, can be the air tank. The additional air which can be supplied, serves, for one, to increase the transport rate of the liquid $NH_3$ gasified by the vaporizer 10 on the remaining path to the exhaust gas line 1. Moreover, through the additionally supplied air, purification or air flushing of the supply line can take place.

Figure 2:
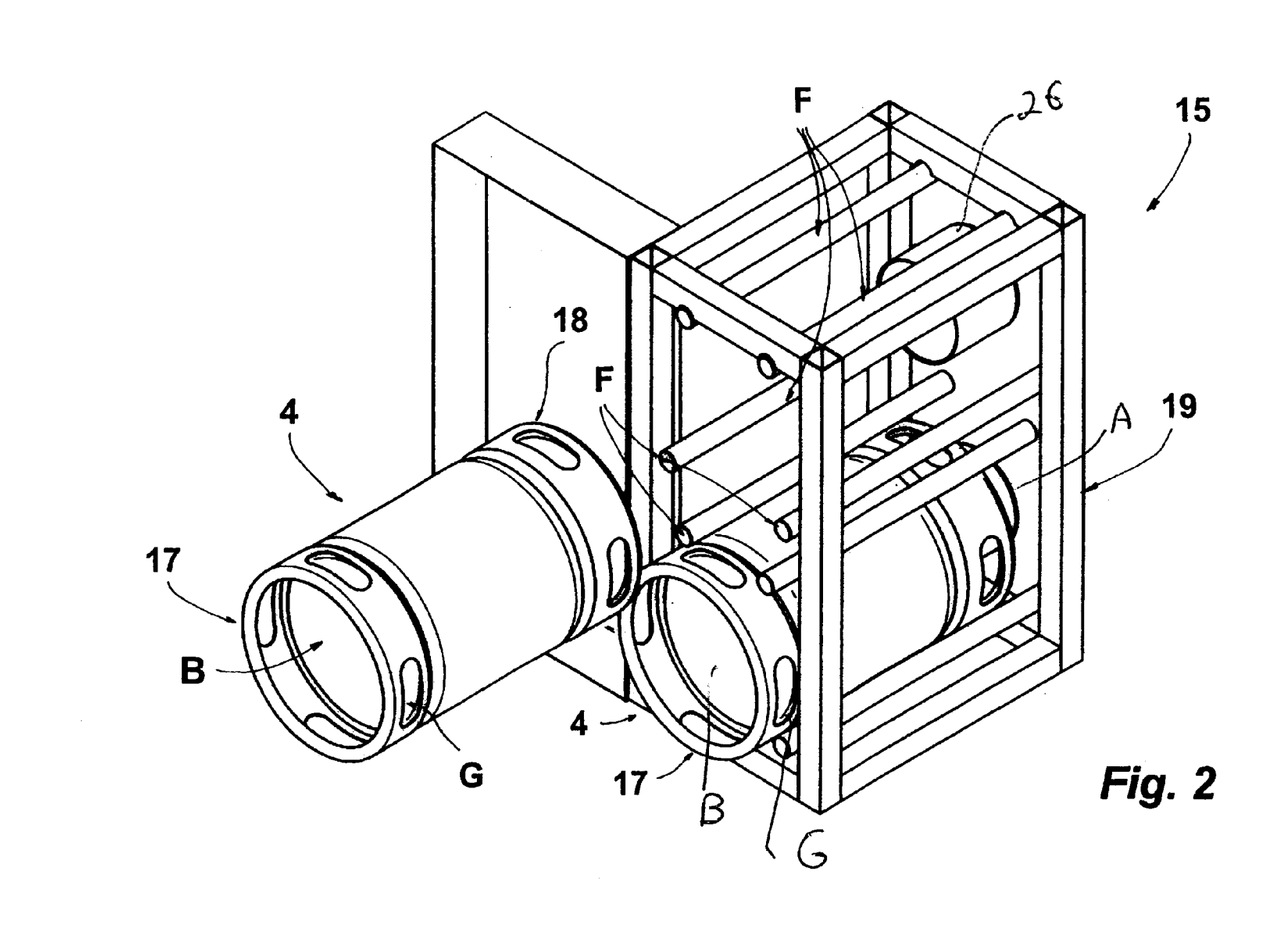

The exhaust gas purification system 3, which is only shown schematically in the form of a block diagram in FIG. 1, comprises further a docking device 15 shown in FIG. 2, for the reception of two reducing agent containers 4 in their horizontal positions. The reduction containers 4 are constructed as pressure-tight containers and have cylindrical shells. The two opposing bases A and B of such containers 4 are configured convexly. In order to be able to handle and also stack such containers 4, handles 17, 18 are disposed at both ends as annular elements into which in each instance grip openings G are introduced.

The docking device 15 comprises a frame 19, in which to each container 4 four guide rods F are assigned, which at an identical angular spacing with respect to one another are in contact on the outer surface of a reduction container. Instead of the guide rods depicted in the figures, other guidance means such as guide rails or the like can also be provided. It is also possible to provide such guide means which permit inserting the reducing agent container only in the correct position in frame 19. The guide rods F serve for guiding and holding an inserted container. The lower container 4 depicted in FIG. 2 is already set into the docking device 15 and the fluid connection to the supply line has been established. With respect to its length, the frame 19 is implemented such that the rear handle 17 of the container 4 projects from the frame 19 such that a person emplacing or changing the container 4 can readily grasp the handle 17 in order to first separate the container 4 from the supply line by completing a rotational movement and subsequently to be able to pull it out of the frame 19.

Figure 3:
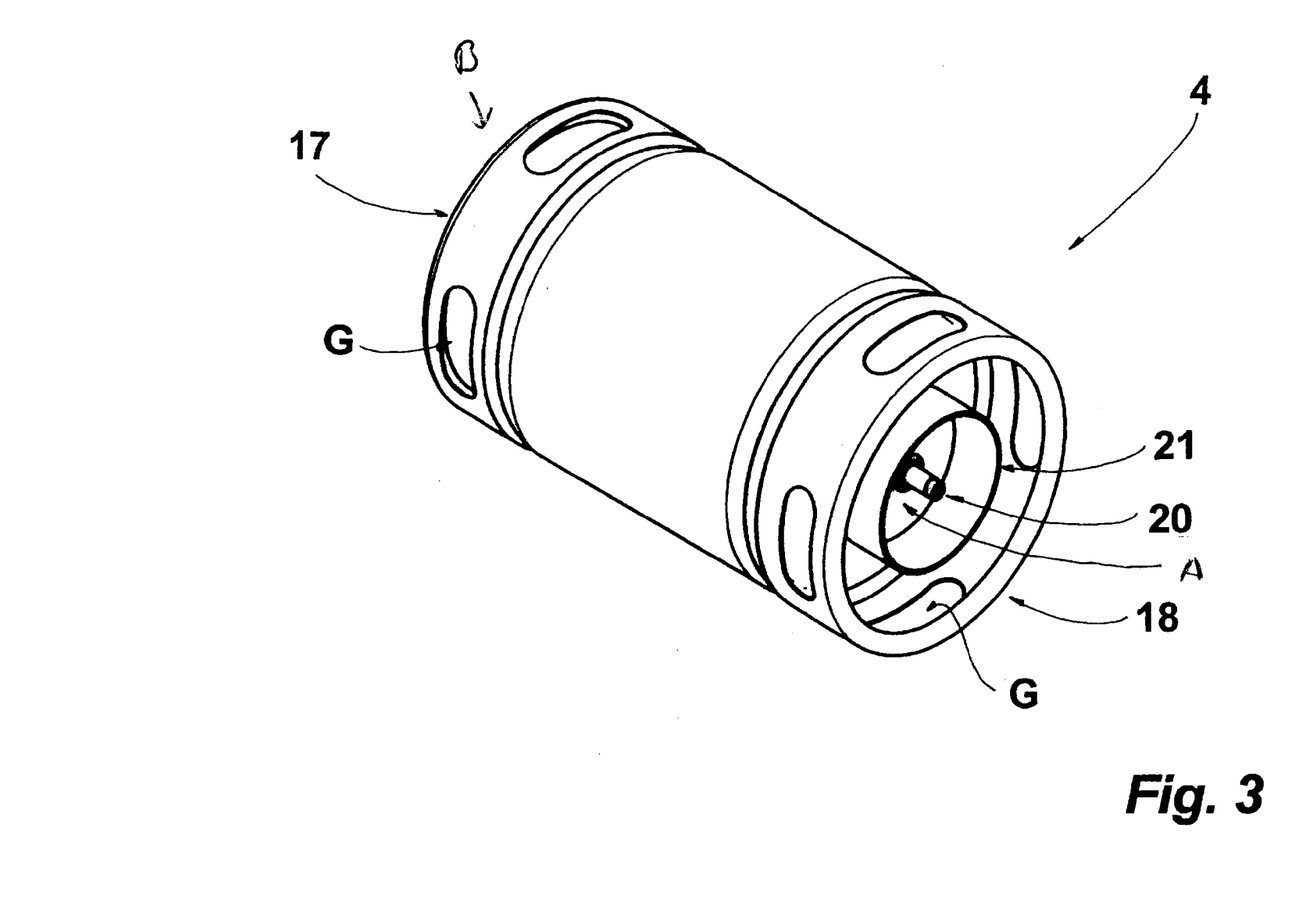

FIG. 3 shows again such a reducing agent container 4, however, in contrast to the depiction of FIG. 2, looking toward the head end and the upper base A. In the base A a coupling part 20 is disposed centrally and projecting from the base A, which can be connected with a further coupling part associated with the docking device 15. The coupling part 20 is concentrically encircled by an annular body 21, which, as will be explained later, serves for guidance during the establishment of the fluid connection.

Figure 4:
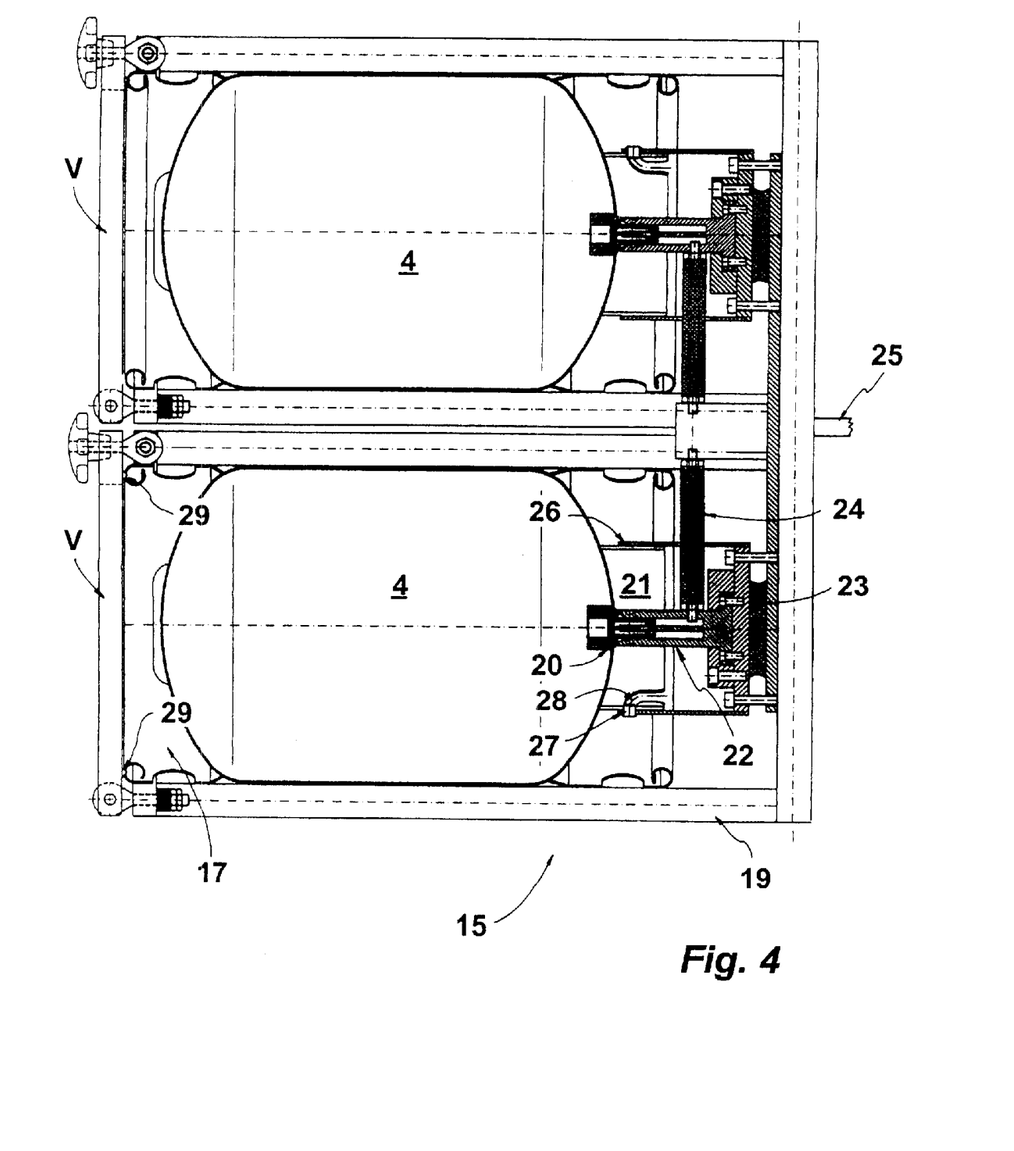

The two containers 4 emplaced in the docking device are shown in the sectional representation of FIG. 4. Both containers 4 are connected or are placed for engagement with their coupling part 20 to a second coupling part 22 associated with the docking device 15. With respect to the frame 19, the second coupling part 22 for preventing the introduction of stresses through potential vibrations of the reduction container 4 into the supply line 7 and units connected therein, is disposed so as to be floating on the frame 19. For this purpose the rearward fastening takes place via a rubber cushion 23; the fluid connection with the supply line proper takes place via a hose 24 or, for example, via a tubular coil (not shown here).

In the docking device 15, further, the units necessary for the removal, the metering valve 8, the vaporizer 10, and the float valve 11, as well as the cycle valve 13 of the air supply device 12 are disposed. For the sake of clarity, these units are not shown in FIG. 4. The docking device 15 comprises an $NH_3$ outflow 25 as a portion of the supply line 7, which ends in the exhaust gas line 1.

For establishing a fluid connection under guidance between a reducing agent container 4 and the second coupling part 22, fastened on the frame 19, serves the annular body 21 as guidance, means which extends into a second annular body 26 associated with the second coupling part 22. This second annular body 26 carries guide pins 27, of which only one is depicted in the Figure. Each guide pin 27 extends into a bayonet groove 28 introduced into the annular body 21 of the container 4. After placing the two annular bodies 21, 26 into engagement and of the guide pin 27 into the bayonet groove 28, the two coupling parts 20, 22 can be brought into a fluid connection with one another by exerting a turning moment onto the rear handle 17 of the container 4.

In the proximity of the insert-side end of frame 19 on it two locking arms V are pivotably articulated on frame 19. The locking arms V serve for securing the container 4 when set into the docking device 15. With the aid of the locking arms V a check also takes place of whether or not the container 4 is in its specified position within frame 19. For this purpose the locking arms V carry noses 29 on their side, facing a container 4, which in this case extend into corresponding openings of the beaded lower rim of the handle 17 when the container 4 is in its specified position. Otherwise, swiveling of the locking arms V to secure the reduction container 4 is not possible.

The following Compilation of Reference Symbols and components is provided to facilitate understanding of the above detailed description and the drawings.

| List of Reference Symbols | |
|---|---|
| 1 | Exhaust gas line |
| 2 | SCR catalyst |
| 3 | Exhaust gas purification system |
| 4 | Reducing agent container |
| 5 | Liquid $NH_3$ |
| 6 | Removal nozzle tube |
| 7 | Supply line |
| 8 | Metering valve |
| 9 | Control system |
| 10 | Vaporizer |
| 11 | Float valve |
| 12 | Air supply device |
| 13 | Cycle valve |
| 14 | Air cylinder |
| 15 | Docking device |
| 17 | Handle |
| 18 | Handle |
| 19 | Frame |
| 20 | Coupling part |
| 21 | Annular body |
| 22 | Coupling part |
| 23 | Rubber cushion |
| 24 | Hose |
| 25 | $NH_3$ outflow |
| 26 | Annular body |
| 27 | Guide pin |
| 28 | Bayonet groove |
| 29 | Nose |
| A | Base, upper |
| B | Base, lower |
| F | Guide rod |
| G | Grip opening |
| V | Locking arm |

Although the present invention has been described with reference to preferred embodiments, numerous modifications and variations can be made and still the result will come within the scope of the invention. No limitation with respect to the specific embodiments disclosed herein is intended or should be inferred.

We claim:

1. An exhaust gas purification system for denoxing exhaust gases of an internal combustion unit on an SCR catalyst (2) using ammonia ($NH_3$) additionally introduced into the exhaust gas flow before the SCR catalyst (2), comprising at least one reducing agent container (4), in which the $NH_3$ (5) to be supplied to the exhaust gas flow is stored, which reduction container (4) is connected via a supply line (7) to the exhaust gas line (1), wherein said container (4) is held in a docking device (15) as a portion of the exhaust gas purification system (3) and, via coupling means (20, 21), is connected with the supply line (7), of which coupling means (20, 21) one coupling part (22) is associated with the docking device (15) and the other coupling part (20) with said container (4), wherein both coupling parts (20, 22) can be engaged with one another by an axial movement directed toward one another, and the docking device (15) and said container(s) (4) comprise cooperating guide means (21, 26, 27, 28), through which said container(s) (4) can be brought into its a specified position under guidance for joining the two coupling parts (20, 22) and wherein said docking device (15) comprises guide rods (F) upon which said container (4) can be brought into the specified position and upon which the said container (4) rests.

2. An exhaust gas purification system for denoxing exhaust gases of an internal combustion unit on an SCR catalyst (2) using ammonia ($NH_3$) additionally introduced into the exhaust gas flow before the SCR catalyst (2), comprising at least one reducing agent container (4), in which the $NH_3$ (5) to be supplied to the exhaust gas flow is stored, which reduction container (4) is connected via a supply line (7) to the exhaust gas line (1), wherein said container (4) is a cylindrical shell held in a docking device (15) as a portion of the exhaust gas purification system (3) and, via coupling means (20, 21), is connected with the supply line (7), of which coupling means (20, 21) one coupling part (22) is associated with the docking device (15) and the other coupling part (20) with said container (4), wherein both coupling parts (20, 22) can be engaged with one another by an axial movement directed toward one another, and the docking device (15) and said container(s) (4) comprise cooperating guide means (21, 26, 27, 28), through which said container(s) (4) can be brought into a specified position under guidance for joining the two coupling parts (20, 22) and one coupling part (20) is disposed at the head end of said container (4), while at the foot end of said container, handle means (17) is disposed for handling said container (4) during an introduction into said docking device (15) and during the engaging of the two coupling parts (20, 22).

3. The exhaust gas purification system as claimed in one of claim 2 or 1, wherein the coupling part (22), associated with the docking device (15), is fastened on the docking device (15) with the decoupling of stresses.

4. The exhaust gas purification system as claimed in one of claim 2 or 1, wherein said guide means (21, 26, 27, 28) are adapted for placing the two coupling parts (20, 22) into engagement with one another, so that apart from the axial movement directed toward one another of the two coupling parts (20, 22), a rotational movement of the two coupling parts (20, 22) relative to one another can also be carried out.

5. The exhaust gas purification system as claimed in one of claim 2 or 1, wherein said guide means (21, 26, 27, 28) comprise a bayonet lock, wherein said container (4) is associated with an annular body (21), concentrically encircling the coupling part (20) associated with the said container (4), and further comprises at least one bayonet groove (28) and said docking device (15) is associated with an annular body (26), concentrically encircling the coupling part (22) associated with said docking device (15), and further comprises a number of guide pins (27) corresponding to the number of bayonet grooves (28).

6. The exhaust gas purification system as claimed in one of claim 2 or 1, wherein said docking device (15) comprises a locking device (V) associated with each container (4), with which the said container (4) set into said docking device (15) is securely held in place.

7. The exhaust gas purification system as claimed in one of claim 2 or 1, wherein said locking device (V) comprises means (29) which form-fittingly extend into the openings associated with said container (4), in order to permit the locking of said locking device (V) only when the container (4) associated with that locking device (V) is in the specified position.

8. The exhaust gas purification system as claimed in claim 2 or 1, wherein said locking device serves a locking arm pivotably articulated on said docking device (15).

9. The exhaust gas purification system as claimed in one of claim 2, or 1 wherein said exhaust gas purification system (3) is operatively connected to remove liquid phase NH$_3$ from said container (4), and that with the said container (4) removal means (6) are associated for removing liquid NH$_3$, and succeeding said removal means (6) in the direction of flow of the NH$_3$ into the supply line (7) is connected a metering device (8), and succeeding said metering device (8) is connected a vaporizer (10), which said metering device and said vaporizer are a portion of said docking device before the supply line (7) ends in the exhaust gas line (1).

10. The exhaust gas purification system as claimed in one of claim 2 or 1, wherein said metering device comprises as a metering valve (8).

11. The exhaust gas purification system as claimed in one of claim 2 or 1, wherein at the output of said vaporizer (10) is disposed a means (11) for hindering or preventing the escape of liquid NH$_3$ from said vaporizer (10).

12. The exhaust gas purification system as claimed in one of claim 2 or 1, wherein said means for preventing the escape of liquid NH$_3$ from the vaporizer comprises a float valve (11).

13. The exhaust gas purification system as claimed in one of claim 2 or 1, wherein said float valve (11) is connected a sensor for detecting the position of the float there.

14. The exhaust gas purification system as claimed in claim 2 or 1, wherein an air supply device (12) for supplying air into the supply line (7) succeeds said vaporizer (10).

15. The exhaust gas purification system as claimed in claim 1 wherein said container (4) comprises a cylindrical shell and one coupling part (20) is disposed at the head end of said container (4), while at the foot end of said container, handle means (17) is disposed for handling said container (4) during an introduction into said docking device (15) and during the engaging of the two coupling parts (20, 22).

16. The exhaust gas purification system as claimed in claim 1, wherein said container (4) is guided by four guide rods (F).

17. The exhaust gas purification system as claimed in claim 2, wherein said means handle (17) comprise a ring encircling the base (B) at said foot and said container (4), with grip openings (G) included therein.

18. The exhaust gas purification system as claimed in claim 1, wherein said docking device (15) comprises guide rods (F) upon which said container (4) can be brought into the specified position and upon which the said container (4) rests.

19. The exhaust gas purification system as claimed in claim 2, wherein said exhaust gas purification system is adapted to remove gaseous phase NH$_3$ from the said container, and a heat source is associated with the reduction container, and adapted such that only a subregion of said container or of its contents is heatable by the heat source.

20. The exhaust gas purification system as claimed in claim 19, wherein the region heated by the heat source, of said container or contents, is disposed in its furthest reaches.

21. The exhaust gas purification system as claimed in claim 19, wherein said heat source is adapted to heat the contents of the said container free of contact therewith.

22. The exhaust gas purification system as claimed in claim 21, wherein with the said containers a heart source for emitting high-emitting high-energy radiation is associated, which is adapted such that only a subregion of said container is located within the radiation emitted by said heat source.

23. The exhaust gas purification system as claimed in claim 22, wherein said heat source for emitting high-energy radiation comprises a source of IR radiation.

24. The exhaust gas purification system as claimed in claim 22, wherein said heat source compromises a transmitter for emitting microwave radiation as the high-energy radiation.

* * * * *